(12) United States Patent
Bunk

(10) Patent No.: US 10,053,063 B2
(45) Date of Patent: Aug. 21, 2018

(54) CONTROL DEVICE FOR AN AUTONOMOUS POWER BRAKING SYSTEM OF A VEHICLE AND METHOD FOR OPERATING AN AUTONOMOUS POWER BRAKING SYSTEM OF A VEHICLE

(71) Applicant: Robert Bosch GmbH, Stuttgart (DE)

(72) Inventor: Michael Bunk, Leingarten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 58 days.

(21) Appl. No.: 14/891,071

(22) PCT Filed: May 5, 2014

(86) PCT No.: PCT/EP2014/059121
§ 371 (c)(1),
(2) Date: Nov. 13, 2015

(87) PCT Pub. No.: WO2014/184034
PCT Pub. Date: Nov. 20, 2014

(65) Prior Publication Data
US 2016/0167629 A1    Jun. 16, 2016

(30) Foreign Application Priority Data

May 15, 2013  (DE) .......................... 10 2013 209 006

(51) Int. Cl.
*G06F 7/40*      (2006.01)
*G06F 19/00*     (2018.01)
(Continued)

(52) U.S. Cl.
CPC .............. *B60T 7/12* (2013.01); *B60T 8/3275* (2013.01); *B60T 8/442* (2013.01); *B60T 8/4845* (2013.01);
(Continued)

(58) Field of Classification Search
USPC ........................................................ 701/70
See application file for complete search history.

(56) References Cited

U.S. PATENT DOCUMENTS 2,142,514 A * 1/1939 Jones ...................... B60T 13/48
                                                      188/356
5,255,963 A * 10/1993 Altmann ............... B60T 8/4291
                                                      303/116.1
(Continued)

FOREIGN PATENT DOCUMENTS

DE       19916700 A1     10/2000
DE       103 24 243      12/2004
(Continued)

OTHER PUBLICATIONS

International Search Report for PCT/EP2014/059121, dated Aug. 5, 2014.

*Primary Examiner* — Jean Paul Cass
(74) *Attorney, Agent, or Firm* — Norton Rose Fulbright US LLP; Gerard Messina

(57) ABSTRACT

A control device for an autonomous power braking system of a vehicle includes: an activation unit configured to (i) output a pump control signal to a pump of the braking system, taking into consideration a supplied presetting signal regarding an autonomous braking pressure buildup to be carried out, in such a way that a braking pressure in a wheel braking cylinder is increased by the activated pump, and (ii) output a brake booster control signal to an active brake booster of the braking system, taking the presetting signal into consideration, in such a way that a boosting force is exerted on at least one adjustable piston of a master brake cylinder of the braking system by the active brake booster in such a way that the braking pressure in the wheel brake cylinder is increased via an increased internal pressure in the master brake cylinder.

20 Claims, 2 Drawing Sheets

(51) Int. Cl.
*G06G 7/00* (2006.01)
*G06G 7/76* (2006.01)
*B60T 7/12* (2006.01)
*B60T 8/32* (2006.01)
*B60T 8/44* (2006.01)
*B60T 8/48* (2006.01)
*B60T 11/10* (2006.01)
*B60T 13/66* (2006.01)
*B60T 13/74* (2006.01)

(52) U.S. Cl.
CPC ............... *B60T 11/10* (2013.01); *B60T 13/66* (2013.01); *B60T 13/745* (2013.01)

(56) References Cited

U.S. PATENT DOCUMENTS

| | | | | |
|---|---|---|---|---|
| 6,135,577 | A * | 10/2000 | Ishii | B60T 8/4045 303/10 |
| 6,212,459 | B1 * | 4/2001 | Unterforsthuber | B60T 7/12 701/70 |
| 6,343,469 | B1 * | 2/2002 | Penninger | B60T 8/328 60/422 |
| 6,634,247 | B2 * | 10/2003 | Pels | B60K 6/26 74/329 |
| 7,188,914 | B1 | 3/2007 | Hecker et al. | |
| 7,739,942 | B2 * | 6/2010 | Wong | B60T 13/162 91/516 |
| 7,739,943 | B2 * | 6/2010 | Wong | B60T 13/162 91/516 |
| 7,765,915 | B2 * | 8/2010 | Davison | B60T 13/162 91/518 |
| 7,779,744 | B2 * | 8/2010 | Wong | B60T 13/161 91/516 |
| 8,061,786 | B2 * | 11/2011 | Drumm | B60T 8/4077 188/358 |
| 9,776,515 | B2 * | 10/2017 | Kunz | B60T 8/4072 |
| 2003/0038715 | A1 * | 2/2003 | Engelman | B60Q 1/44 340/439 |
| 2010/0276239 | A1 * | 11/2010 | Wuerth | B60T 8/266 188/358 |
| 2011/0031072 | A1 * | 2/2011 | Leiber | B60T 8/00 188/72.3 |
| 2014/0183933 | A1 * | 7/2014 | Kuhlman | B60T 1/10 303/3 |
| 2015/0202989 | A1 * | 7/2015 | Bussmann | B60W 10/08 701/70 |

FOREIGN PATENT DOCUMENTS

| | | |
|---|---|---|
| EP | 0436926 A2 | 7/1991 |
| JP | S52121174 A | 10/1977 |
| JP | 2009523647 A | 6/2009 |
| JP | 2010064652 A | 3/2010 |
| WO | WO 2009/083216 | 7/2009 |

\* cited by examiner

CONTROL DEVICE FOR AN AUTONOMOUS POWER BRAKING SYSTEM OF A VEHICLE AND METHOD FOR OPERATING AN AUTONOMOUS POWER BRAKING SYSTEM OF A VEHICLE

BACKGROUND OF THE INVENTION

1. Field of the Invention

The present invention relates to a control device for an autonomous power braking system of a vehicle. The present invention further relates to an autonomous power braking system for a vehicle. The present invention moreover relates to a method for operating an autonomous power braking system of a vehicle.

2. Description of the Related Art

Published German patent application document DE 103 24 243 A1 describes a method and a device for decelerating a motor vehicle with the aid of a driver assistance system. With the aid of the method and the device, it should be possible to carry out driver-independent brake interventions by initially carrying out a braking pressure buildup in the wheel brake cylinders of a rear axle brake circuit not connected to a master brake cylinder with the aid of a pump supplied from a brake fluid reservoir, and by activating an auxiliary pump of a front axle brake circuit connected to the master brake cylinder for the braking pressure buildup in the wheel brake cylinders of the front axle brake circuit exclusively for stronger vehicle decelerations. An additional braking pressure buildup in the wheel brake cylinders of the front axle brake circuit with the aid of a return pump of the front axle brake circuit should only be carried out to achieve a maximal vehicle deceleration.

BRIEF SUMMARY OF THE INVENTION

The present invention enables a joint use of the at least one pump and of the active brake booster for a faster and/or lower-noise braking pressure buildup in the at least one wheel brake cylinder for carrying out an autonomous (zero-driver-braking-force) brake application. Since the active brake booster, such as an electromechanical brake booster and/or a vacuum brake booster, is generally already present in the braking system, a use of the present invention does not require the autonomous power braking system to be additionally equipped with a further component. As a result of the multifunctionality of the active brake booster achievable with the aid of the present invention, it is possible to reduce the manufacturing costs, the assembly complexity and/or the installation space requirement of the autonomous power braking system. Moreover, the active brake booster may generally be used in a quiet manner. In this way, the noise occurring in a conventional autonomous (zero-driver-braking-force) braking pressure buildup exclusively with the aid of at least one pump is eliminated due to the present invention.

As is described in greater detail hereafter, the combination of the at least one pump and the active brake booster implemented by the present invention enables very high pressure buildup dynamics across the entire value range of the braking pressures effectuatable in the at least one wheel brake cylinder. The high pressure buildup dynamics achievable by the present invention has an advantageously high slope of the pressure-time characteristic curve from a depressurized state of the at least one wheel brake cylinder to the locking pressure level present therein. Disadvantages/weak points of the conventional moderate pressure buildup dynamics in an autonomous (zero-driver-braking-pressure) braking pressure buildup with the aid of only at least one pump may thereby be eliminated due to the present invention.

An autonomous brake application need not be understood to mean a zero-driver-braking-force brake application. With the aid of the present invention, an autonomous braking pressure increase via a pressure predefined by the driver is also conceivable, for example. However, it is pointed out that the present invention is advantageously also suited for a zero-driver-braking-force braking pressure buildup as the autonomous braking pressure buildup.

Advantageously, the activation unit is designed to jointly activate the active brake booster with the aid of the at least one brake booster control signal and the at least one pump with the aid of the at least one pump control signal in such a way that the braking pressure in the at least one wheel brake cylinder may be increased autonomously and/or with zero driver braking force. (A joint activation shall not necessarily be understood to mean a simultaneous activation or an activation for the simultaneous operation of the active brake booster and the at least one pump.) The activation unit may in particular be designed to jointly activate the active brake booster with the aid of the at least one brake booster control signal and the at least one pump with the aid of the at least one pump control signal in such a way that the braking pressure in the at least one wheel brake cylinder may be increased autonomously and/or with zero driver braking force for a driver assistance function or for an emergency brake application. The control device may thus be used in a versatile manner.

In one advantageous specific embodiment, the activation unit is designed to activate an electromechanical brake booster as the active brake booster with the aid of the at least one brake booster control signal. The present invention may thus also be used for braking systems including an electromechanical brake booster which may be used for regulated brake boosting and/or for blending a generator braking torque. The present invention thus contributes to prompting the driver to use a braking system which is equipped with an electromechanical brake booster and which, due to the advantageous usability of the electromechanical brake booster for blending the generator braking torque, allows the vehicle equipped therewith to be driven with lower emissions and lower fuel consumption.

The activation unit is preferably designed to simultaneously operate the at least one pump and the active brake booster. By using the at least one pump and the active brake booster simultaneously, a faster braking pressure buildup may be carried out in the at least one wheel brake cylinder. With the aid of the present invention, a rapid autonomous/zero-driver-braking-force brake application may thus still be carried out reliably, in particular in an emergency braking situation.

As an alternative or in addition, the activation unit may also be designed to operate the active brake booster and the at least one pump consecutively in such a way that the braking pressure in the at least one wheel brake cylinder may first be increased from a starting pressure to an intermediate pressure exclusively with the aid of the active brake booster activated by the at least one brake booster control signal, and may then be increased from the intermediate pressure to a higher pressure exclusively with the aid of the at least one pump activated by the at least one pump control signal. As is described in greater detail hereafter, this joint consecutive activation of the at least one pump and the active brake booster offers advantageous pressure buildup dynamics.

In a further advantageous specific embodiment, the activation unit is designed to receive the presetting signal from an external driver assistance device and/or from an external emergency braking device. The control device may thus advantageously cooperate with a driver assistance device and/or an emergency braking device already present in the vehicle. As an alternative, the control device may also cooperate with at least one internal and/or external sensor(s) in such a way that an evaluation unit of the control device supplies the presetting signal to the activation unit, taking the at least one sensor signal of the at least one sensor into consideration. In this way, a plurality of embodiment options may be implemented for the control device.

In one advantageous refinement, the control device is designed as a driver assistance device and/or as an emergency braking device. The control device may thus also effectuate more comfortable and/or safer driving of the vehicle equipped therewith without cooperation with a further device.

The advantages described in the preceding paragraphs are also ensured in an autonomous power braking system for a vehicle including such a control device.

The advantages may moreover be achieved by carrying out a corresponding method for operating an autonomous power braking system of a vehicle. The method for operating an autonomous power braking system is refinable according to the above-described specific embodiments of the control device.

DETAILED DESCRIPTION OF THE INVENTION

FIGS. 1a through 1d show schematic representations of one specific embodiment of the control device and coordination systems to explain its operating mode.

Figure 1A:
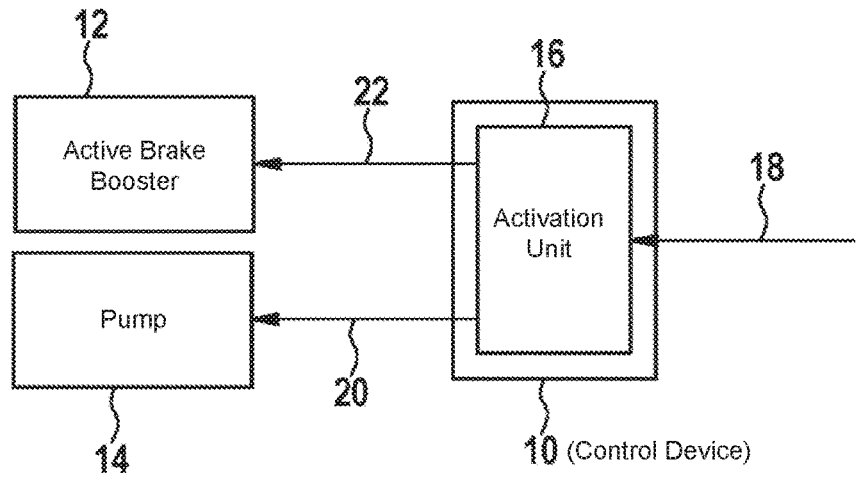
FIGS. 1a through 1d show schematic representations of one specific embodiment of the control device and coordination systems to explain its operating mode.

Control device 10 shown schematically in FIG. 1a may be used together with an autonomous power braking system of a vehicle. An autonomous power braking system may be understood to mean a braking system which includes an active brake booster 12, with the aid of which a boosting power is exertable on at least one adjustable piston of a master brake cylinder (not shown) of the braking system in such a way that an internal pressure in the master brake cylinder may be increased. The active brake booster is preferably also designed to assist the driver with respect to force during an actuation of a brake actuating element (not shown), such as a brake pedal. Such an active brake booster 12 is frequently situated between the brake actuating element and the master brake cylinder. Active brake booster 12 may in particular be an electromechanical brake booster and/or a vacuum brake booster. However, it is pointed out that the usability of control device 10 is not limited to one particular type and/or one particular system of active brake booster 12.

The autonomous power braking system usable together with control device 10 may at least partially be definable as a hydraulic braking system including at least one pump 14. It is pointed out that the usability of control device 10 is not limited to one particular design of the at least one pump 14 and/or at least one brake circuit of the autonomous power braking system. Since the autonomous power braking system may thus be equipped with a plurality of different brake circuits, the exact composition of the autonomous power braking system is not addressed here.

Control device 10 includes an activation unit 16, which is designed to output at least one pump control signal 20 to the at least one pump 14 of the braking system, taking into consideration a supplied presetting signal 18 with respect to an autonomous braking pressure buildup to be carried out in at least one wheel brake cylinder (not shown) of the braking system. The at least one pump 14 is activatable with the aid of the at least one pump control signal 20 in such a way that a braking pressure in the at least one wheel brake cylinder may be increased with the aid of the at least one pump 14 activated by the at least one pump control signal 20. Activation unit 16 is moreover additionally designed to output at least one brake booster control signal 22 to active brake booster 12, taking presetting signal 18 into consideration, in such a way that a boosting force is (directly or indirectly) exertable on the at least one adjustable piston of the master brake cylinder with the aid of active brake booster 12 activated by the at least one brake booster control signal 22. In this way, the at least one piston is adjustable by exerting the boosting force in such a way that an internal pressure in the master brake cylinder may be increased as a result of the at least one adjusted piston, and the braking pressure in the at least one wheel brake cylinder may be increased with the aid of the increased internal pressure.

The advantageous design of activation unit 16 thus offers a joint activation of the at least one pump 14 and of active brake booster 12 for carrying out an autonomous (zero-driver-braking-force) braking pressure buildup in the at least one wheel brake cylinder. In this process, activation unit 16 takes advantage of the fact that an active brake booster 12 is frequently present in a braking system. A component already present in the braking system may thus be used to support the at least one pump 14 in an autonomous (zero-driver-braking-force) braking pressure buildup. In this way, it is also possible to limit a number of pumps 14 used for the autonomous braking pressure buildup.

For example, the at least one return pump 14 generally present in the braking system may be used exclusively as the at least one pump 14. Equipping the braking system with a further pump, in addition to the at least one return pump 14, may thus be dispensed with. Since, due to the advantageous joint use of the at least one pump 14 and of active brake booster 12, it is not necessary to connect the at least one pump 14 in a certain way and/or to equip the braking system with further pumps; a plurality of different brake circuits may be present in the braking system. In addition to saving further pumps, this also ensures the advantage of great design freedom of the at least one brake circuit of the braking system.

Moreover, an operation of active brake booster 14 is usually quiet. Contrary to a conventional autonomous/zero-driver-braking-force braking pressure buildup exclusively with the aid of the operation of the at least one pump 14, the autonomous braking pressure buildup achieved by activation unit 16 by the joint activation of the at least one pump 14 and of active brake booster 12 is therefore comparatively quiet. Further advantages of the joint activation of the at least one pump 14 and of active brake booster 12 with the aid of activation unit 16 are described hereafter.

Activation unit 16 may be designed to jointly activate active brake booster 12 with the aid of the at least one brake booster control signal 22 and the at least one pump 14 with the aid of the at least one pump control signal 20 in such a way that the braking pressure in the at least one wheel brake cylinder may be increased autonomously and/or with zero driver braking force. In particular, the braking pressure in the at least one wheel brake cylinder may be increasable autonomously/with zero driver braking force for a driver assistance function or for an emergency brake application. Control device 10 may be used in a versatile manner.

Activation unit 16 may optionally be designed to receive presetting signal 18 from an external driver assistance device and/or from an external emergency braking device. As an alternative, the control device may also be designed itself as a driver assistance device and/or as an emergency braking device. For example, control device 10 may be designed to cooperate with at least one internal or external sensor, in particular with at least one sensor for ascertaining a piece of ambient information, such as a radar sensor, an ultrasonic sensor and/or a camera. In this case, control device 10 preferably also includes an evaluation unit (not shown), with the aid of which the at least one sensor signal of the at least one sensor may be evaluated. The evaluation unit may in particular be designed to detect, based on the at least one sensor, that an autonomous brake intervention is advantageous as a result of the instantaneous piece of ambient information/traffic information, and, if necessary, to provide presetting signal 18.

Control device 10 may thus also increase a safety standard and/or a driving comfort of the vehicle equipped therewith without the cooperation with a further device. It is pointed out that a plurality of different driver assistance functions may be carried out with the aid of control device 10. For example, control device 10 may also additionally be designed to activate elements of the chassis, of the drive train and/or of the steering system of the vehicle equipped therewith.

Since the designability of control device 10 is not limited to one particular type of driver assistance device and/or emergency braking device, the embodiment options are not addressed in greater detail here.

Figure 1B:
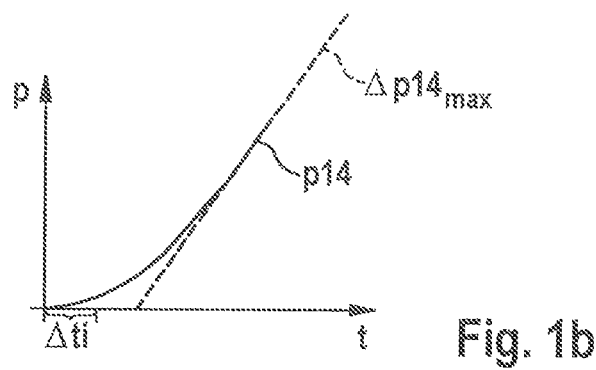
Figure 1C:
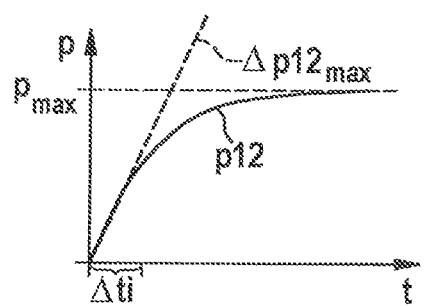
Figure 1D:
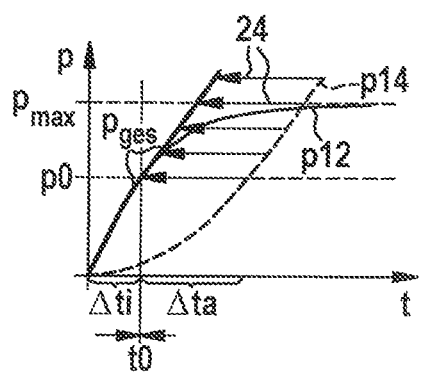

An operating mode of control device 10 of FIG. 1a is shown based on the coordinate systems of FIGS. 1b through 1d. The x-axes of the coordinate systems of FIGS. 1b through 1d are in each case time axis t. The y-axes of the coordinate systems of FIGS. 1b through 1d reflect a braking pressure p which may be autonomously built up in the at least one wheel brake cylinder within a time interval from 0 up to time t.

In the exemplary embodiment described here, activation unit 16 is designed to activate at least one return pump 14 as the at least one pump 14, and an electromechanical brake booster 12 as active brake booster 12, for generating an autonomous brake intervention.

The coordinate system of FIG. 1b shows a characteristic curve p14 (pressure buildup dynamics) of braking pressure p built up in at least one wheel brake cylinder exclusively with the aid of the at least one return pump 14 (in the case of an autonomous/zero-driver-braking-force braking force buildup) as a function of time t. It is noticeable that characteristic curve p14 of the at least one return pump 14 has a minimum at a braking pressure equal to zero. (This also applies to an activation of the at least one return pump 14 with 100% supply voltage.) Within a starting time interval Δti (beginning at a starting time t=0), characteristic curve p14 of the at least one return pump 14 has a comparatively small slope during an autonomous (zero-driver-braking-force) braking force buildup starting from a depressurized state. This is due to a non-linear volume uptake of the wheel brake cylinders during an autonomous braking pressure buildup exclusively with the aid of the at least one return pump 14. Characteristic curve p14 of the at least one return pump 14 increases at a comparatively large slope $\Delta p14_{max}$ only at higher braking pressures/after starting time interval t1.

The coordinate system of FIG. 1c shows a characteristic curve p14 (pressure buildup dynamics) of braking pressure p built up in at least one wheel brake cylinder exclusively with the aid of the electromechanical brake booster (in the case of an autonomous/zero-driver-braking-force braking force buildup) as a function of time t. Characteristic curve p12 of electromechanical brake booster 12 has a comparatively large slope $\Delta p12_{max}$ within starting time interval Δti during an autonomous (zero-driver-braking-force) braking force buildup starting from a depressurized state. This may also be described in such a way that characteristic curve p12 of electromechanical brake booster 12 has a high pressure buildup gradient/comparatively large slope $\Delta p12_{max}$ across a wide pressure range despite the non-linear volume uptake of the at least one wheel brake cylinder. However, maximally achievable braking pressure $p_{max}$ for an autonomous braking pressure buildup exclusively with the aid of electromechanical brake booster 12 is limited early. As a result, characteristic curve p12 of electromechanical brake booster 12 has low slopes in a pressure range close to the maximally achievable braking pressure $p_{max}$. Moreover, it is not possible to increase braking pressure p above the maximally achievable braking pressure $p_{max}$ when exclusively using the electromechanical brake booster.

The advantageous cooperation between active brake booster 12 and the at least one pump 14 which is achievable with the aid of activation unit 16 is shown based on the coordinate system of FIG. 1d. It is apparent that activation unit 16 is designed to operate active brake booster 12 and the at least one pump 14 consecutively in such a way that braking pressure p in the at least one wheel brake cylinder may first be increased from a starting pressure (such as in particular the atmospheric pressure) to an intermediate pressure p0 exclusively with the aid of active brake booster 12 activated by the at least one brake booster control signal 22, and then may be increased from intermediate pressure p0 to a higher pressure exclusively with the aid of the at least one pump 14 activated by the at least one pump control signal 20. This may also be described in such a way that an initial pressure buildup during starting time interval Δti takes place exclusively with the aid of active brake booster 12, until intermediate pressure p0 is reached at an intermediate time t0. Starting at intermediate pressure p0/intermediate time t0, the further pressure buildup takes place exclusively with the aid of the at least one pump 14 during a continuation time interval Δta. Intermediate pressure p0, or intermediate time t0, is preferably selected in such a way that characteristic curve p12 of active brake booster 12 has large slopes below intermediate pressure p0, while characteristic curve p14 of the at least one pump 14 increases with a large slope above intermediate pressure p0. In one preferred specific embodiment, intermediate pressure p0, or intermediate time t0, is established in such a way that a slope dp12/dt of characteristic curve p12 of active brake booster 12 is only smaller than a slope dp14/dt of characteristic curve p14 of the at least one pump 14 after intermediate pressure p0/intermediate time p0.

The resulting characteristic curve $p_{ges}$ of braking pressure p built up in at least one wheel brake cylinder with the aid of the joint operation first of active brake booster 12, and then of the at least one pump 14 (in the case of an autonomous/zero-driver-braking-force braking force buildup), as a function of time t is shown in the coordinate system of FIG. 1*d*. Characteristic curve $p_{ges}$ of the joint operation first of active brake booster 12, and then of the at least one pump 14, has comparatively large slopes for all times t. In this way, the procedure described here ensures a pressure buildup in the at least one wheel brake cylinder which is maximized across a very wide pressure range. Moreover, an increase in the braking pressure above maximally achievable braking pressure $p_{max}$ when exclusively using active brake booster 12 is easy to implement during the joint operation, indicated with the aid of arrows 24, first of active brake booster 12 and then of the at least one pump 14.

In addition to the above-described procedure, activation unit 16 may also be designed to operate the at least one pump 14 and active brake booster 12 simultaneously in certain traffic situations. In particular in emergency braking situations, this may achieve a strong pressure buildup in the at least one wheel brake cylinder for an autonomous brake intervention. In this way, the vehicle may be brought to a halt quickly, in particular in an emergency braking situation.

The above-described advantages are also ensured in an autonomous power braking system for a vehicle including control device 10.

Figure 2:
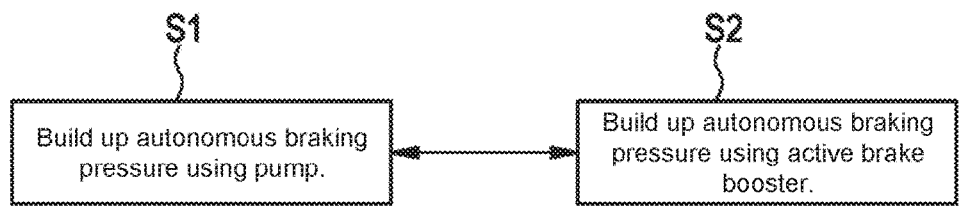
FIG. 2 shows a flow chart to explain one specific embodiment of the method for operating an autonomous power braking system of a vehicle.

FIG. 2 shows a flow chart to explain one specific embodiment of the method for operating an autonomous power braking system of a vehicle.

The method includes a method step S1, in which an autonomous (zero-driver-braking-force) braking pressure buildup is partially carried out in at least one wheel brake cylinder of the braking system. This takes place by operating at least one pump of the braking system in such a way that a braking pressure in the at least one wheel brake cylinder is increased with the aid of the operated at least one pump. The at least one pump may be at least one return pump, for example. However, the ability to carry out the method is not limited to the (exclusive) use of the at least one return pump for carrying out method step S1.

The method also includes a method step S2, in which the autonomous (zero-driver-braking-force) braking pressure buildup is also partially carried out in the at least one wheel brake cylinder of the braking system. In method step S2, an active brake booster of the braking system is additionally operated in such a way that a boosting power is exerted on at least one adjustable piston of a master brake cylinder of the braking system with the aid of the active brake booster. This takes place in such a way that the braking pressure in the at least one wheel brake cylinder is increased with the aid of an internal pressure in the master brake cylinder which is increased as a result of the at least one adjusted piston. For example, an electromechanical brake booster may be used to carry out method step S2. However, the ability to carry out method step S2 is not limited to the use of an electromechanical brake booster.

In one advantageous specific embodiment, method steps S1 and S2 may be carried out simultaneously, so that the at least one pump and the active brake booster are operated simultaneously. This ensures a comparatively fast braking pressure buildup in the at least one wheel brake cylinder, in particular for carrying out an emergency brake application.

In a further advantageous specific embodiment, the active brake booster and the at least one pump may also be operated consecutively. Method step S2 is thus carried out prior to method step S1. The active brake booster and the at least one pump are preferably activated consecutively in such a way that the braking pressure in the at least one wheel brake cylinder is first increased from a starting pressure/depressurized state to an intermediate pressure exclusively with the aid of the active brake booster, and then from the intermediate pressure to a higher pressure exclusively with the aid of the at least one pump. This ensures advantageous pressure buildup dynamics, as already described above.

With the aid of the joint operation of the active brake booster and the at least one pump according to the method described here, a driver assistance function or an emergency brake application may be carried out. The method may thus advantageously be used for a plurality of usage options.

What is claimed is:

1. A control device for an autonomous power braking system of a vehicle, comprising:
   an activation unit configured to:
      output at least one pump control signal to at least one pump of the braking system, taking into consideration a supplied presetting signal with respect to an autonomous braking pressure buildup to be carried out in at least one wheel brake cylinder of the braking system, in such a way that a braking pressure in the at least one wheel brake cylinder, which produces a corresponding braking force on at least one wheel of the vehicle, is increased with the aid of the at least one pump activated by the at least one pump control signal; and
      output at least one brake booster control signal to an active brake booster of the braking system, taking the presetting signal into consideration, in such a way that a boosting force is exerted on at least one adjustable piston of a master brake cylinder of the braking system with the aid of the active brake booster activated by the at least one brake booster control signal in such a way that the braking pressure in the at least one wheel brake cylinder, which produces the corresponding braking force on the at least one wheel of the vehicle, is increased with the aid of an internal pressure in the master brake cylinder which is increased as a result of the at least one adjustable piston,
   wherein the activation unit is configured to operate the active brake booster and the at least one pump consecutively in such a way that the braking pressure in the at least one wheel brake cylinder, which produces the corresponding braking force on the at least one wheel of the vehicle, is first increased from a starting pressure to an intermediate pressure exclusively with the aid of the active brake booster activated by the at least one brake booster control signal, and then from the intermediate pressure to a higher pressure exclusively with the aid of the at least one pump activated by the at least one pump control signal, and
   wherein the consecutive operation of the active brake booster and the at least one pump to increase the corresponding braking force on the at least one wheel of the vehicle is performed by the activation unit autonomously.

2. The control device as recited in claim 1, wherein the activation unit is configured to jointly activate the active brake booster with the aid of the at least one brake booster control signal and the at least one pump with the aid of the at least one pump control signal in such a way that the braking pressure in the at least one wheel brake cylinder is autonomously increased for one of a driver assistance function or an emergency brake application.

3. The control device as recited in claim 1, wherein the activation unit is configured to activate an electromechanical brake booster as the active brake booster with the aid of the at least one brake booster control signal.

4. The control device as recited in claim 1, wherein the activation unit is configured to also operate the at least one pump and the active brake booster simultaneously.

5. The control device as recited in claim 1, wherein the activation unit is configured to receive the presetting signal from at least one of an external driver assistance device and an external emergency braking device.

6. The control device as recited in claim 1, wherein the control device is configured as at least one of a driver assistance device and an emergency braking device.

7. A method for operating an autonomous power braking system of a vehicle, comprising:
at least partially carrying out an autonomous braking pressure buildup in at least one wheel brake cylinder of the braking system by (i) operating at least one pump of the braking system in such a way that a braking pressure in the at least one wheel brake cylinder is increased with the aid of the operated at least one pump; and (ii) additionally operating an active brake booster of the braking system in such a way that a boosting force is exerted on at least one adjustable piston of a master brake cylinder of the braking system with the aid of the active brake booster in such a way that the braking pressure in the at least one wheel brake cylinder is increased with the aid of an internal pressure in the master brake cylinder which is increased as a result of the at least one adjusted piston,
wherein the active brake booster and the at least one pump are operated consecutively in such a way that the braking pressure in the at least one wheel brake cylinder, which produces a corresponding braking force on at least one wheel of the vehicle, is first increased from a starting pressure to an intermediate pressure exclusively with the aid of the active brake booster, and then from the intermediate pressure to a higher pressure exclusively with the aid of the at least one pump, and
wherein the consecutive operation of the active brake booster and the at least one pump to increase the corresponding braking force on the at least one wheel of the vehicle is performed autonomously.

8. The method as recited in claim 7, wherein the at least one pump and the active brake booster are also operated simultaneously.

9. The method as recited in claim 7, wherein one of a driver assistance function or an emergency brake application is carried out with the aid of the joint operation of the active brake booster and the at least one pump.

10. A control device for an autonomous power braking system of a vehicle, comprising:
an activation unit configured to:
output at least one pump control signal to at least one pump of the braking system, taking into consideration a supplied presetting signal with respect to an autonomous braking pressure buildup to be carried out in at least one wheel brake cylinder of the braking system, in such a way that a braking pressure in the at least one wheel brake cylinder is increased with the aid of the at least one pump activated by the at least one pump control signal; and
output at least one brake booster control signal to an active brake booster of the braking system, taking the presetting signal into consideration, in such a way that a boosting force is exerted on at least one adjustable piston of a master brake cylinder of the braking system with the aid of the active brake booster activated by the at least one brake booster control signal in such a way that the braking pressure in the at least one wheel brake cylinder is increased with the aid of an internal pressure in the master brake cylinder which is increased as a result of the at least one adjustable piston,
wherein the activation unit is configured to operate the active brake booster and the at least one pump consecutively in such a way that the braking pressure in the at least one wheel brake cylinder is first increased from a starting pressure to an intermediate pressure exclusively with the aid of the active brake booster activated by the at least one brake booster control signal, and then from the intermediate pressure to a higher pressure exclusively with the aid of the at least one pump activated by the at least one pump control signal,
wherein the intermediate pressure is selected so that a slope of a characteristic pressure curve of the at least one pump is greater than a slope of a characteristic pressure curve of the active brake booster for pressures higher than the intermediate pressure.

11. A method for operating an autonomous power braking system of a vehicle, comprising:
at least partially carrying out an autonomous braking pressure buildup in at least one wheel brake cylinder of the braking system by (i) operating at least one pump of the braking system in such a way that a braking pressure in the at least one wheel brake cylinder is increased with the aid of the operated at least one pump; and (ii) additionally operating an active brake booster of the braking system in such a way that a boosting force is exerted on at least one adjustable piston of a master brake cylinder of the braking system with the aid of the active brake booster in such a way that the braking pressure in the at least one wheel brake cylinder is increased with the aid of an internal pressure in the master brake cylinder which is increased as a result of the at least one adjusted piston,
wherein the active brake booster and the at least one pump are operated consecutively in such a way that the braking pressure in the at least one wheel brake cylinder, which produces a corresponding braking force on at least one wheel of the vehicle, is first increased from a starting pressure to an intermediate pressure exclusively with the aid of the active brake booster, and then from the intermediate pressure to a higher pressure exclusively with the aid of the at least one pump, and
wherein the intermediate pressure is selected so that a slope of a characteristic pressure curve of the at least one pump is greater than a slope of a characteristic pressure curve of the active brake booster for pressures higher than the intermediate pressure.

12. The control device as recited in claim 10, wherein the braking pressure in the at least one wheel brake cylinder and the corresponding braking force on the at least one wheel of the vehicle are increasable via the operation of the active brake booster and the at least one pump autonomously and with zero driver braking force.

13. The control device as recited in claim 10, wherein the activation unit is configured to consecutively activate the active brake booster and the at least one pump in such a way that the braking pressure in the at least one wheel brake cylinder and the corresponding braking force on the at least one wheel is autonomously increased with zero driver braking force for one of a driver assistance function or an emergency brake application.

14. The control device as recited in claim 10, wherein the activation unit is configured to also operate the at least one pump and the active brake booster simultaneously.

15. The control device as recited in claim 10, wherein the activation unit is configured to receive the presetting signal from at least one of an external driver assistance device and an external emergency braking device.

16. The method as recited in claim 11, wherein the at least one pump and the active brake booster are also operated simultaneously.

17. The method as recited in claim 11, wherein one of a driver assistance function or an emergency brake application is carried out with the aid of the consecutive operation of the active brake booster and the at least one pump.

18. The method as recited in claim 11, wherein the braking pressure and corresponding braking force buildup is performed autonomously with zero driver braking force.

19. The control device as recited in claim 1, wherein the consecutive operation of the active brake booster and the at least one pump to increase the corresponding braking force on the at least one wheel of the vehicle is performed with zero driver braking force.

20. The method as recited in claim 7, wherein the consecutive operation of the active brake booster and the at least one pump to increase the corresponding braking force on the at least one wheel of the vehicle is performed with zero driver braking force.

* * * * *